United States Patent [19]

Hagen

[11] Patent Number: 5,359,888
[45] Date of Patent: Nov. 1, 1994

[54] AIR TURBULENCE AND WIND SHEAR SENSOR

[75] Inventor: Floyd W. Hagen, Eden Prairie, Minn.

[73] Assignee: The BF Goodrich Company, Akron, Ohio

[21] Appl. No.: 18,071

[22] Filed: Feb. 16, 1993

[51] Int. Cl.$^5$ .............................................. G01C 21/00
[52] U.S. Cl. ................................. 73/178 R; 73/178 T; 73/180
[58] Field of Search ............. 73/178 R, 178 T, 178 H, 73/180; 340/968, 963, 967; 364/433; 244/181

[56] References Cited

U.S. PATENT DOCUMENTS

| | | | |
|---|---|---|---|
| 3,327,972 | 6/1967 | Greene | 244/77 |
| 3,840,200 | 10/1974 | Lambregts | 244/77 |
| 3,935,460 | 1/1976 | Flint | 250/349 |
| 3,955,071 | 5/1976 | Lambregts | 235/150.2 |
| 4,012,713 | 3/1977 | Greene et al. | 340/27 R |
| 4,079,905 | 3/1978 | Greene | 244/191 |
| 4,189,118 | 2/1980 | Peter-Contese | 244/182 |
| 4,189,777 | 2/1980 | Kuntman | 364/433 |
| 4,212,444 | 7/1980 | Stephan | 244/182 |
| 4,229,725 | 10/1980 | Reilly | 340/27 |
| 4,250,746 | 2/1981 | Vassie et al. | 73/178 |
| 4,266,130 | 5/1981 | Kuhn | 250/399 |
| 4,281,383 | 7/1981 | Lebrun | 364/428 |
| 4,378,696 | 4/1983 | DeLeo et al. | 73/180 |
| 4,378,697 | 4/1983 | DeLeo et al. | 73/182 |
| 4,585,341 | 4/1986 | Woodfield | 356/28.5 |
| 4,589,070 | 5/1986 | Kyrazis | 364/424 |
| 4,593,285 | 6/1986 | Miller et al. | 340/968 |
| 4,652,122 | 3/1987 | Zincone et al. | 356/28.5 |
| 4,725,811 | 2/1988 | Muller et al. | 73/178 T |
| 4,728,951 | 3/1988 | Johnson et al. | 340/968 |
| 4,763,266 | 8/1988 | Schultz et al. | 364/433 |
| 4,836,019 | 6/1989 | Hagen et al. | 73/180 |
| 4,836,019 | 6/1989 | Hagen et al. | 73/180 |
| 4,853,861 | 8/1989 | Ford et al. | 364/424.06 |
| 4,855,738 | 8/1989 | Greene | 340/968 |
| 4,857,922 | 8/1989 | Miller et al. | 73/178 T |
| 4,937,571 | 6/1990 | Bonafe | 340/968 |
| 4,965,572 | 10/1990 | Adamson | 73/178 T |

*Primary Examiner*—Donald Woodiel
*Attorney, Agent, or Firm*—Nickolas E. Westman; Richard A. Romanchik

[57] ABSTRACT

An apparatus detects an air turbulence and wind shear encountered by an air vehicle having an accelerometer sensing air vehicle vertical acceleration. The apparatus includes a pressure sensor having a pressure sensing port for sensing a pressure parameter of a local air flow which changes with changes in the local airflow turbulence, and a fast time constant pressure transducer coupled to the pressure port for generating a transducer signal representative of the parameter. Differentiating means calculates a time derivative of the transducer signal and provides a turbulence signal representative of the time derivative. Subtracter means provides the difference between the turbulence signal and a vertical acceleration signal from the accelerometer, to provide a wind shear indicating signal indicative of an increase in air turbulence. The apparatus also preferably includes a second differentiating means for calculating a time derivative of the wind shear indicating signal and provides a turbulence severity signal which when above a selected level indicates that corrective control action should be taken.

20 Claims, 3 Drawing Sheets

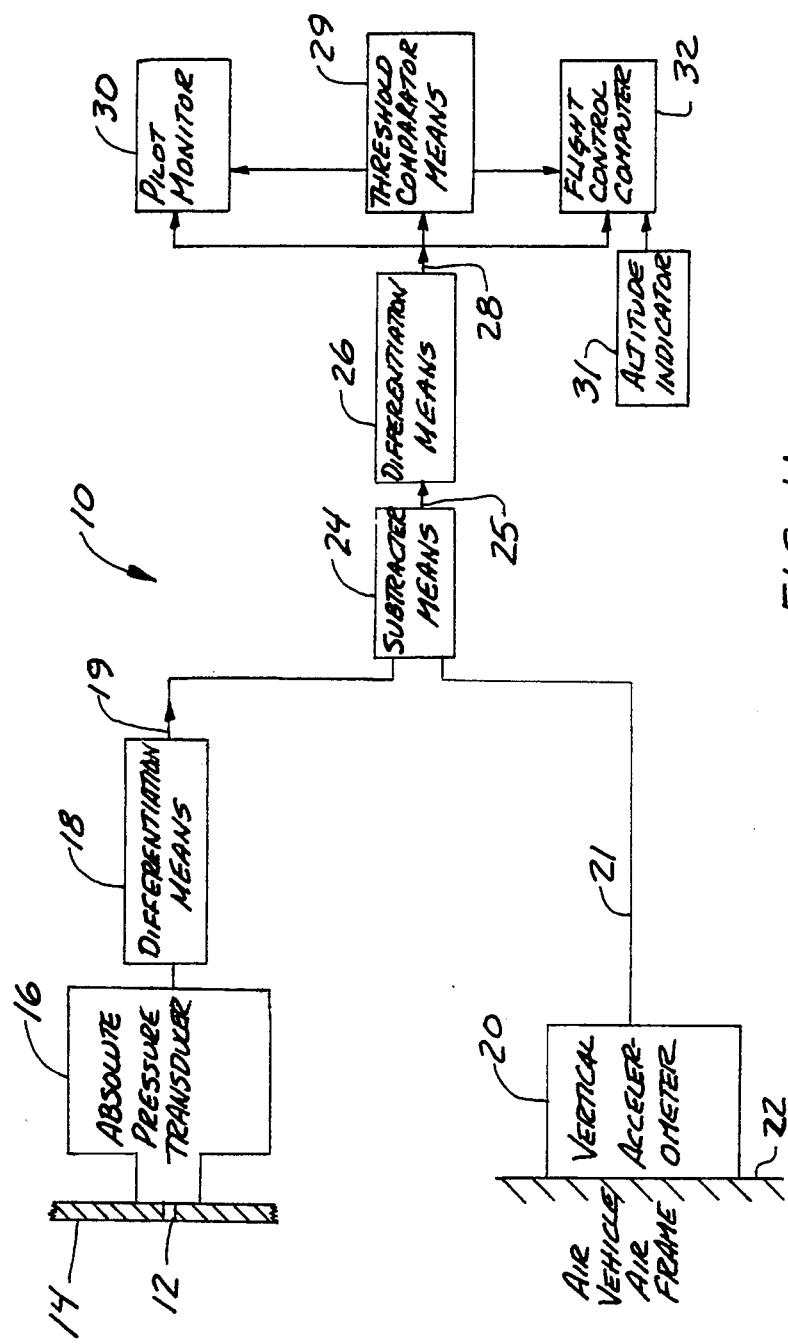
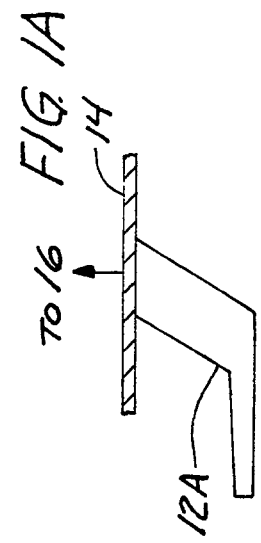

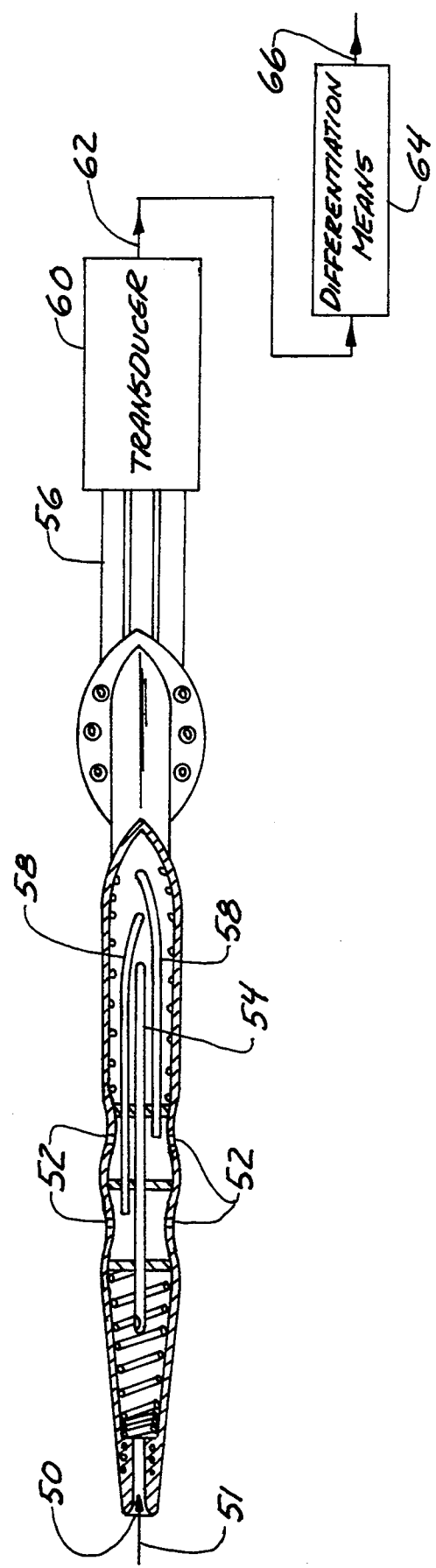

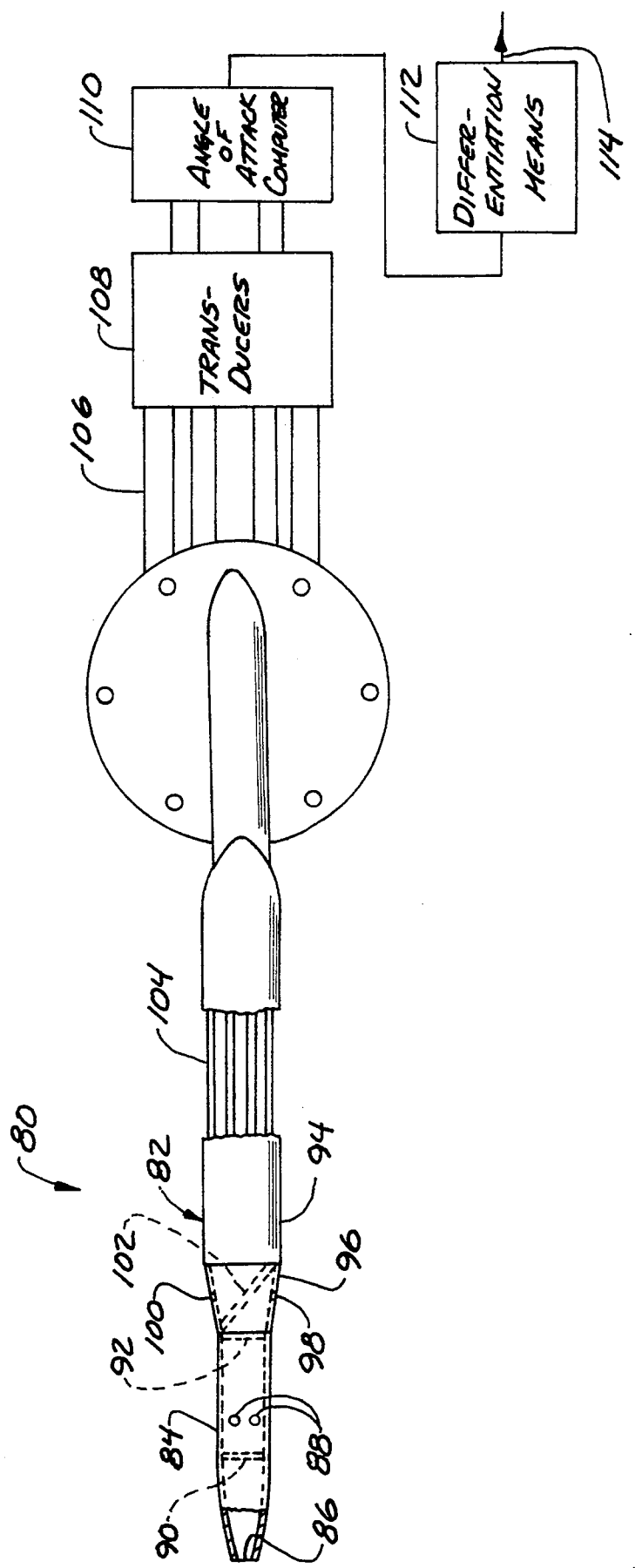

AIR TURBULENCE AND WIND SHEAR SENSOR

BACKGROUND OF THE INVENTION

The invention relates generally to air data sensing systems to be used in conjunction with air vehicle flight performance computer systems, and, in particular, to air turbulence and wind shear detection systems.

Wind shear involves rapidly changing wind conditions in which wind velocity and direction may vary substantially over short distances or short time intervals. Wind shear creates particular hazards to air vehicles during takeoffs and approaches for landing. A rapidly decreasing head wind causes significant loss of lift, which is dangerous during takeoff or landing when air speed is low and the air vehicle's angle of attack is high. Sudden down drafts disrupt the climb of the air vehicle.

It is desirable to warn the pilot and/or send a signal to a flight control computer as the air vehicle is entering an area of increasing wind shear. The pilot or computer can then increase air vehicle power and also change air vehicle angle of attack as the air vehicle enters into an area of increasing wind shear. Both ground-based and airborne wind shear detection systems are currently known, and while it is desirable to determine hazardous wind shear conditions as soon as possible, oversensitivity generates excess nuisance or false warnings. Indications of wind shear without producing unnecessary warnings remain a desired goal.

SUMMARY OF THE INVENTION

The present invention relates to an apparatus on board an air vehicle for early detection of air turbulence and wind shear. An accelerometer senses air vehicle vertical acceleration and a pressure sensor senses changes in pressure indicating turbulence in local air flow adjacent the air vehicle. A pressure transducer receives instantaneous fluctuations in the turbulence from the sensor and provides a turbulence signal indicative of turbulence of the local air flow. A static pressure signal, a pitot pressure signal, or a local flow angle signal differentiated with respect to time comprise the turbulence signal. An increase in the difference between the turbulence signal and a vertical acceleration signal from the accelerometer indicates an increase in air turbulence and comprises a wind shear indicating signal.

A preferred embodiment of the present invention includes differentiation means which calculates a first order time derivative of the wind shear indicating signal and provides a turbulence severity signal indicating severity of the air turbulence. A significant wind shear encounter is indicated whenever the magnitude of the turbulence severity signal exceeds a threshold level. The air turbulence severity signal can be coupled to a flight control computer which automatically increases air vehicle power and the air vehicle angle of attack toward a maximum allowable angle of attack whenever the magnitude of the turbulence severity signal exceeds the threshold level and the air vehicle is at an altitude below a low altitude threshold level.

The apparatus includes a pressure port which senses a parameter of the local airflow which changes substantially instantaneously when there is air turbulence. The parameter can be static pressures sensed at a static pressure port, pitot pressure sensed at a pitot pressure port, or static and/or pitot pressure sensed by a pitot-static probe. Because a fast time constant is important, a pressure transducer is coupled to the sensing port or ports with large diameter conduits to avoid dampening the pressure signals. The pressure transducer generates a pressure signal representative of a turbulence sensitive pressure. Differentiating means calculates the derivative of the pressure signal from the transducer with respect to time and provides the turbulence signal representative of this derivative. A signal representing vertical acceleration of the air vehicle is subtracted from the turbulence signal, and an increase in this difference indicates increasing wind turbulence and wind shear.

In another preferred embodiment of the present invention, the apparatus includes a multi-function air data sensing probe. The air data sensing probe includes angle of attack sensing ports as well as pitot and static pressure sensing ports. In this embodiment, a fast time constant pressure transducer generates transducer signals representative of changes in local flow angle using the signals from the angle of attack ports and a normalized function based on pitot and static pressures. The local flow angle changes substantially instantaneously with turbulence, and thus the turbulence signal is obtained.

Regardless of how the local pressure dependent turbulence signal is obtained, when a vertical acceleration signal is subtracted, a wind shear indicating signal results. Differentiating the wind shear indicating signal with respect to time, provides the turbulence severity signal. Air vehicle inertia causes the vertical acceleration signal to be slower in response than local air pressure derived signals and the subtraction filters out longer, slower turbulence induced frequencies, so the wind shear signal obtained corresponds to high frequency turbulence in the local air flow. Wind shear signal magnitude indicates when potentially dangerous activity is occurring in the air.

BRIEF DESCRIPTION OF THE DRAWINGS

FIG. 1 is a block diagram of a sensing system for sensing increased air turbulence for advance warning of wind shear according to the present invention;

FIG. 1A is a fragmentary schematic view of a pitot tube used with the sensing system of FIG. 1;

FIG. 2 is a schematic diagram of an embodiment of the present invention utilizing a pitot-static tube; and FIG. 3 is a schematic diagram of an embodiment of the present invention utilizing a multi-functional air data probe.

DETAILED DESCRIPTION OF THE PREFERRED EMBODIMENTS

A sensing system 10 shown schematically in FIG. 1 senses increased air turbulence and provides advance warning of wind shear. System 10 is on board an air vehicle. A local pressure sensor 12 as shown as a flush static port is provided at an air vehicle skin 14. Various other local pressure sensors are suitable for use as well, such as a pitot tube 12A shown in FIG. 1A, and as shown in FIGS. 3 and 4, a pitot-static tube or a multi-function probe. The local pressure sensor senses pressure components of local airflow adjacent the air vehicle and provides a rapid indication of turbulence caused by pressure changes. An absolute pressure transducer 16 having a very fast time constant is short coupled to the local pressure sensor and converts the local pressure components into electric signals. "Short coupling" means that the pressure changes are essentially unfiltered between the pressure sensor and the transducer.

Large diameter, short transmission tubes provide "short coupling." Differentiation means 18 receives the pressure signals from transducer 16 and provides a turbulence signal on line 19, indicating turbulence in the local airflow and representing a time derivative of the pressure signals.

A vertical accelerometer 20 is attached at an air vehicle air frame 22 and provides a vertical acceleration signal on line 21. The vertical accelerometer 20 is a standard part of an inertial navigation system used in modern air vehicles and senses vertical acceleration. Subtracter means 24 calculates the difference between a function of the turbulence signal on line 19 and a function of the vertical acceleration signal from the accelerometer 20 on line 21 and provides a wind shear indicating signal on line 25. Subtracter means 24 can comprise a conventional analog comparator providing a continuous difference output. The subtracter means 24 can include filters to individually adjust, as a function of frequency, the amplitude and phase of the outputs from differentiation means 18 and vertical accelerometer 20 so that the outputs are correlated before comparison. Such filters can also include precision rectifier circuits and averaging circuits or root-mean-square (RMS) value computing circuits to compare average or RMS values of the outputs. Calculations can be done using known analog, digital or computer circuits. The filters are adjusted empirically to match the characteristics of the sensors and the aircraft. The accelerometer 20 is slower in responding to the ambient wind or turbulence conditions than pressure transducer 16 because of the inertia of the air vehicle. An increase in the difference between the turbulence signal and the vertical acceleration of the air vehicle indicates an increase in air turbulence and wind shear. Thus, the wind shear indicating signal provides information indicating wind shear or turbulence and is used as a warning signal that high frequency turbulence is present. Empirical data measurements are used to ascertain the exact relationship between the acceleration signal and the turbulence signal for a given air vehicle because the inertia caused delay of the acceleration signal will be different for different types of air vehicles.

The pressure signals travel at substantially the speed of sound which is approximately 1100 feet per second through air at sea level. In typical applications, several inches of conduit are necessary to couple the local pressure sensor to the transducer. If, for example, the speed of sound at sea level is used for illustration purposes, a three inch long conduit coupling the local pressure sensor to the transducer corresponds to an approximate time of 0.0002 seconds for the pressure signal to travel from the local pressure sensor to the transducer. Thus, relative to the physical movement of the air vehicle, which causes the inertia delay inherent in the vertical acceleration signal on line 21, the changes in the sensed pressure are substantially instantaneously transferred to the transducer.

Differentiation means 26 calculates a first order time derivative of the wind shear indicating signal on line 25 and provides an advance wind shear signal or turbulence severity signal on line 28, representing this derivative. The turbulence severity signal on line 28 provides an indication of increasing severity of air turbulence and wind shear.

Turbulence severity signal 28 is optionally provided directly to a pilot monitor 30 so as to enable the pilot to respond appropriately at a very early state when the air vehicle is just entering a fringe area of increased severe wind shear. Turbulence severity signal 28 is also optionally provided to threshold comparator means 29, which generates a significant wind shear encounter warning whenever the magnitude of the turbulence severity signal exceeds a preset threshold level. The preset threshold level is empirically ascertained from the relationship between the acceleration signal and the turbulence signal for a given air vehicle. This threshold level will be different for air vehicles of different designs and can be determined by inflight tests, or possibly large scale wind tunnel tests or dynamic laboratory tests on the structures. This significant wind shear encounter warning can be provided directly to the pilot monitor.

The turbulence severity signal 28 is also optionally provided directly to a flight control computer 32. The significant wind shear encounter warning generated by the threshold comparator means 29 can also be supplied directly to the fight control computer so that when the air vehicle is at low altitude (taking off or landing) significant wind shear encounter signals cause the flight control computer to automatically increase air vehicle power and the air vehicle's angle of attack. The air vehicle's angle of attack is increased toward its maximum allowable angle of attack. For example, when the air vehicle enters a turbulent downburst (microburst), sensing system 10 anticipates the decrease in the air vehicle's angle of attack due to the downburst because the turbulence severity signal 28 will exceed the threshold level, indicating the significant wind shear encounter due to the microburst. The turbulence severity signal will then signal an abort of a normal final approach and landing. An altitude signal from an altimeter, ground proximity radar or other type of altitude indicator 31 provides a signal indicating low altitude so the commands from the flight computer can be connected to altitude.

The differentiation means, subtraction means, and the comparator means that are used in the present invention can be implemented with well known techniques such as with discrete circuit components or with a processor unit, or units appropriately programmed depending on the particular application.

An embodiment of the present invention uses a pitot-static tube as illustrated in FIG. 2. A suitable pitot-static tube is disclosed in other patents assigned to the assignee of the present application such as the DeLeo et al. U.S. Pat. No. 4,378,697, which is herein incorporated by reference. A pitot port 50 senses total pressure, indicated by arrow 51, of the local airflow. Static ports 52 sense the static pressure of the local airflow as is well known. A total pressure conduit 54 couples the total pressure signal to one of a plurality of large diameter and short conduits 56, and static pressure conduits 58 couple the static pressure to other of the large diameter conduits 56. Conduits 56 couple the static and total pressure sensed by the pitot-static tube to transducer 60 without dampening the signals so that changes in the sensed pressure are substantially instantaneously transferred to transducer 60. Transducer 60 provides an electrical signal on line 62 representing an impact pressure signal. This measured impact pressure ($p_{cm}$) is equal to the difference between the total measured pressure ($p_{tm}$) minus measured static pressure ($p_m$). Differentiation means 64 calculates the first order time derivative of the differential pressure signal 62 to produce a turbulence signal on line 66, representative of the turbulence in the local airflow. In other words, the turbulence of the local airflow is a function of the first order time derivative of measured impact pressure ($q_{cm}$). Thus, the turbulence signal is indicated by $\tau = f(\dot{q}_{cm})$, where $\dot{q}_{cm} = d(q_{cm})/dt$.

The turbulence signal on line 66 is coupled to the input of the subtracter means 24, shown in FIG. 1, in place of the turbulence signal on line 19. The subtracting means subtracts the acceleration signal on line 21 from accelerometer 20 from the turbulence signal on line 66. As indicated above, the vertical acceleration ($\dot{v}$) responds slower than the pressure transducer because of the inertia of the air vehicle, and the output of the subtracter means is a function of high frequency turbulence in the atmosphere. Thus, an increase in air turbulence and wind shear ($\dot{s}$) is indicated by $\dot{s} = [(\dot{q}_{cm}) - (\dot{v})]$, and comprises the wind shear indicating signal on line 25. The increasing severity of turbulence is indicated by $\ddot{s} = d[(\dot{q}_{cm}) - (\dot{v})]/dt$. While the example indicates use of the measured impact pressure, the same relativity exists when using measured static pressure or measured pitot pressure. In other words, the first order time derivative of the wind shear indicating signal signifies increasing severity of turbulence, and comprises the turbulence severity signal on line 28.

A preferred embodiment includes a multi-functional air data probe as generally indicated at 80 in FIG. 3. Probe 80 measures a local flow angle or an angle of attack of the airflow over the surface of an air vehicle. A suitable multi-functional probe is disclosed in other patents assigned to the assignee of the present application such as the DeLeo U.S. Pat. No. 4,378,696 and the Hagen et al. U.S. Pat. No. 4,836,019, which are herein incorporated by reference. Probe 80 has a barrel 82 with three distinct sections. A first cylindrical section 84 includes a tapered forward end which has an opening or port 86 which is used for sensing the pitot pressure or total measured pressure ($p_{tm}$). A plurality of static sensing ports 88 are arranged around the circumference of the section 84. The static pressure sensing ports 88 are separated with a forward bulkhead 90 and a rear bulkhead 92. The ports 88 are located in a region to provide measured static pressure ($p_m$).

Probe 80 has a rear cylindrical section 94 which has a larger diameter than the diameter of forward cylindrical section 84. A transition section 96 having an expanding diameter joins the first section 84 and the rear section 94. A pair of angle of attack sensing ports 98 and 100 are provided through the wall of transition section 96. The ports 98 and 100 have axis lying in the plane in which the angle of attack is measured and face generally in opposite directions (down and up, respectively). A bulkhead 102 forms separate chambers for ports 98 and 100. The pressure of the first (lower) angle of attack sensing port 98 is represented as $p_{\alpha 1}$ and the pressure at the second (upper) angle of attack sensing port 100 is indicated by $p_{\alpha 2}$. The pressure difference between the upper and lower ports indicates angle of attack, as shown in U.S. Pat. No. 4,378,696. Separate pressure carrying conduits 104 carry the pressure from pitot port 86, static ports 88, and each of the angle of attack sensing ports 98 and 100.

A plurality of large diameter and short conduits 106 couple the pressure signals carried by conduits 104 to transducer 108 without substantially dampening the signals. The local angle of attack is indicated by $\alpha_1 = f[(p_{\alpha 1} - p_{\alpha 2})/q_{cN}]$, where $q_{cN}$ is a normalizing function measured by probe 80. Several methods of deriving the normalizing function are available and explained in other patents assigned to the assignee of the present application such as the above mentioned U.S. Pat. Nos. 4,378,696 and 4,836,019. For example, either of the following two equations could be used to obtain the normalizing function:

$$q_{cN1} = (p_{tm} - p_m)$$

$$q_{cN2} = p_{tm} - \left[\frac{p_{\alpha 1} + p_{\alpha 2}}{2}\right] = (p_{tm} - p_{\alpha 1}) + \left(\frac{p_{\alpha 1} - p_{\alpha 2}}{2}\right)$$

The normalizing function $q_{cN2}$ is preferable so that only two differential pressure measurements need to be made by transducer 108 to generate the necessary signals to be able to derive the angle of attack. If $q_{cN2}$ is used, then transducer 108 provides the differential measurement of ($p_{tm} - p_{\alpha 1}$) and ($p_{\alpha 1} - p_{\alpha 2}$). Therefore, an angle of attack computer 110 calculates the local angle of attack by the following equation:

$$\alpha_1 = f\left[\frac{p_{\alpha 1} - p_{\alpha 2}}{(p_{tm} - p_{\alpha 1}) + \left(\frac{p_{\alpha 1} - p_{\alpha 2}}{2}\right)}\right]$$

Because transducer 108 is coupled to probe 80 with large diameter and short conduits, which cause little or substantially no dampening of the sensed signals, the time constant is reduced to a level where the change in measured local flow angle ($\alpha_1$) substantially equals the local air turbulence of the air through which the air vehicle is flying. Differentiation means 112 calculates the first order time derivative of the measured local flow angle ($\alpha_1$) and generates a turbulence signal ($\dot{\alpha}_1$), on output line 114, representative of the turbulence in the local airflow. The turbulence signal on line 114 is coupled to the input of the subtracter means 24, shown in FIG. 1, in place of turbulence signal 19. The subtracter means subtracts the vertical acceleration signal from accelerometer 20 on line 21 from the turbulence signal on line 114. The increase in the difference between the turbulence signal and the acceleration signal indicates increasing air turbulence, and comprises the wind shear indicating signal on line 25 in FIG. 1 as represented by the following equation:

$$\dot{s} = [(\dot{\alpha}_1) - (\dot{v})]$$

The first order time derivative of this difference indicates increasing severity of air turbulence through which the air vehicle is flying, and comprises the turbulence severity signal 28, as indicated by the following equation:

$$\ddot{s} = d[(\dot{\alpha}_1) - (\dot{v})]/dt$$

The present invention responds much faster to small increases in turbulence as compared to just a vertical accelerometer by itself. As a result, the present invention will sense when an air vehicle is entering an area of increasing air turbulence before the air vehicle structure reacts to the turbulence.

In either of the embodiments described above and illustrated in FIGS. 2 and 3, the increase in local flow turbulence indicated by either ($\dot{p}_1$) measured by a flush static port, $\dot{p}_m$ or $\dot{p}_{tm}$ measured by a pitot or pitot static tube, or ($\dot{\alpha}_1$), is sensed at a very early stage when the air vehicle is just entering the fringe area of increased air turbulence. To achieve this goal, advanced warning system 10 must have a very fast time constant which is achieved, as explained above, by coupling the pressure transducer to the local pressure sensor with relatively large internal diameter conduits which need to be as short as possible for the particular installation application of system 10. To further reduce the time constant for determining local flow turbulence, the transducer itself must also have a fast time constant. Many commercially available transducers, such as solid state air data sensors, are accurate and have small internal volumes which result in a sufficient fast time constant.

Since the wind shear parameter ($\dot{s}$) comprises only the high frequency turbulence of the local airflow, the rate of change of the wind shear parameter ($\ddot{s}$) indicates when the high frequency turbulence of the local airflow is increasing at a rate associated with an area of increasing wind shear. Because of the fast time constant for determining turbulence and because of the filter effect resulting from using the vertical acceleration in the wind shear sensing, the pilot or the flight control computer receive a wind shear warning as early as possible without generating excessive nuisance warnings. To further this goal, a threshold level ($\dot{s}_T$) is used as explained above, so that a significant wind shear encounter is indicated whenever the magnitude of the wind shear signal ($\dot{s}$) exceeds the threshold level ($\dot{s}_T$).

Additionally, as explained above, the wind shear signal ($\dot{s}$) can be directly coupled to the local flow angle of attack ($\alpha_1$) input of the flight control computer. When the magnitude of the wind shear parameter exceeds the threshold level ($\dot{s}_T$) at low altitudes (takeoff and landing), the flight control computer automatically increases power and the air vehicle angle of attack ($\alpha_{FRL}$) toward its maximum allowable angle of attack indicated by $(\alpha_{FRL})_{MAX.} = f(\alpha_1)$. Note that the air vehicle's angle of attack is measured in reference to the fuselage reference line (FRL). When $(\dot{s}) > (\dot{s}_T)$, the flight control computer automatically anticipates a decrease in $\alpha_{FRL}$ when the air vehicle is just entering a turbulent downburst and forces an abort of a normal final approach and landing.

Although substration means are disclosed for obtaining the difference between the air pressure related signal and accelerometer signal, the two signals may be combined using other arithmetic circuits to obtain a signal indicative of the difference between the two signals. Thus, the disclosure contemplates other arithmetic operations of functions to obtain an indication of the difference between the air pressure and accelerometer signals.

Although the present invention has been described with reference to preferred embodiments, workers skilled in the art will recognize that changes may be made in form and detail without departing from the spirit and scope of the invention.

What is claimed is:

1. An apparatus for the detection of air turbulence and wind shear encountered by an air vehicle having an accelerometer attached thereto which provides an inertia affected vertical acceleration signal indicating sensed air vehicle vertical acceleration, the apparatus comprising:

sensor means for substantially instantaneously sensing a pressure parameter related to local airflow adjacent the air vehicle and providing a first signal representing substantially instantaneous changes in the pressure parameter relative to time and responding to any change in the pressure parameter more rapidly than the accelerometer providing the vertical acceleration signal; and means for combining the first signal and the vertical acceleration signal from the accelerometer and obtaining a wind shear indicating signal indicative of an increase in air turbulence as a function of the difference between the signals.

2. The apparatus according to claim 1 further comprising:

differentiation means for providing a turbulence severity signal indicating increasing severity of air turbulence and representative of a first order time derivative of the wind shear indicating signal.

3. The apparatus according to claim 2 further comprising:

comparator means connected to the differentiation means to provide an output indicating relatively significant wind shear when the magnitude of the turbulence severity signal exceeds a threshold level.

4. The apparatus according to claim 3 wherein the output of the comparator means is coupled to a flight control computer to automatically adjust air vehicle power and air vehicle angle of attack.

5. The apparatus according to claim 4 further comprising:

means for indicating air vehicle altitude coupled to the flight control computer, the flight control computer responding to the turbulence severity signal at altitudes below a low altitude threshold level.

6. The apparatus of claim 1 wherein the means for combining signals comprises subtraction means.

7. An apparatus for the detection of air turbulence and wind shear encountered by an air vehicle having an accelerometer attached thereto for sensing inertially affected air vehicle vertical acceleration, the apparatus comprising:

a sensor having port means for sensing a selected pressure parameter of local airflow adjacent the air vehicle;

a pressure transducer coupled to the sensor to have a high frequency response time to local airflow pressure changes and generating a transducer signal representative of high frequency changes of the sensed pressure parameter;

means for providing a turbulence signal indicating such high frequency pressure changes sensed in the local airflow and representative of a first order time derivative of the transducer signal; and means for obtaining a wind shear indicating signal representing an increase in air turbulence as a function of the difference between the high frequency turbulence signal and a vertical acceleration signal from the accelerometer.

8. The apparatus according to claim 7 wherein the means for obtaining the wind shear indicating signal comprises:

subtraction means, and second differentiation means for providing a turbulence severity signal indicating increasing severity of air turbulence and representative of a first order time derivative of the wind shear indicating signal.

9. The apparatus according to claim 7 wherein the pressure transducer is coupled to the sensor with relatively large diameter conduits.

10. The apparatus according to claim 7 wherein the sensor comprises:
a pitot port for sensing a total pressure of the local airflow and a static port for sensing static pressure of the local airflow.

11. The apparatus according to claim 10 wherein the transducer signal is representative of the difference between the total and static pressures and indicative of the local airflow velocity.

12. An apparatus for the detection of air turbulence and wind shear encountered by an air vehicle, the apparatus comprising:
an accelerometer sensing air vehicle acceleration and providing an accelerometer signal indicating acceleration in an air vehicle reference plane with a response time frequency dampened by inertia of the air vehicle;
an air data probe having port means for sensing pressure parameters of the local airflow adjacent the air vehicle which change according to a local flow angle of attack from a reference line in the reference plane;
conversion means for providing a local flow angle signal indicating changes in the angle of attack in response to the pressure parameters sensed at high frequency by the air data probe;
derivation means for providing a turbulence signal indicative of a turbulence in the local airflow and representative of the first order time derivative of the local flow angle signal; and
subtraction means for obtaining a wind shear indicating signal representing an increase in air turbulence as a function of the difference between the high frequency turbulence signal and the inertia dampened accelerometer signal.

13. The apparatus according to claim 12 further comprising:
second differentiation means for providing a turbulence severity signal indicating increasing severity of air turbulence and representative of a first order time derivative of the wind shear indicating signal.

14. The apparatus according to claim 12 wherein the air data probe comprises:
a pitot port for sensing a total pressure of the local airflow; and
oppositely facing angle of attack ports for sensing the angle of attack pressure parameters.

15. The apparatus according to claim 14 wherein the conversion means comprises:
pressure transducer means coupled to the air data probe for generating transducer signals as a function of the total pressure of the local airflow and the angle of attack pressure parameters.

16. The apparatus according to claim 15 wherein the conversion means further comprises means for providing the local flow angle signal as a normalized function of the transducer signals.

17. The apparatus according to claim 16 wherein the air data probe further includes a static port for sensing a static pressure of the local airflow, and wherein the transducer signals are also a function of the static pressure.

18. The apparatus according to claim 15 wherein the pressure transducer means is coupled to the air data probe with relatively large diameter conduits.

19. A method for detecting air turbulence and wind shear encountered by an air vehicle providing a signal indicating an increase in air turbulence comprising the steps of:
sensing a pressure parameter related to local airflow adjacent the vehicle and providing a first signal substantially instantaneously indicating changes in the pressure parameter relative to time;
providing an inertially affected acceleration signal indicating sensed air vehicle vertical acceleration which responds at a frequency substantially less than the frequency response of the first signal; and
combining the first signal and the vertical acceleration signal to obtain a wind shear indicating signal indicative of an increase in air turbulence as a function of the difference between the first and vertical acceleration signals.

20. The method of claim 19 further comprising subtracting the first and vertical acceleration signals to provide a difference signal, and differentiating the difference signal to provide a severity signal indicating increasing severity of air turbulence, representing a first order time derivative of the wind shear indicating signal.

* * * * *